United States Patent
Chen

(10) Patent No.: US 9,235,235 B2
(45) Date of Patent: Jan. 12, 2016

(54) SLIDE DEVICE HAVING A MULTI CONSTRAINT FUNCTION

(71) Applicant: Wistron Corporation, New Taipei (TW)

(72) Inventor: Jhih-Ming Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 466 days.

(21) Appl. No.: 13/654,438

(22) Filed: Oct. 18, 2012

(65) Prior Publication Data

US 2013/0163899 A1 Jun. 27, 2013

(30) Foreign Application Priority Data

Dec. 26, 2011 (TW) .............................. 100148556 A

(51) Int. Cl.
- H05K 5/00 (2006.01)
- G06F 1/16 (2006.01)
- H04M 1/02 (2006.01)

(52) U.S. Cl.
CPC ........... *G06F 1/1624* (2013.01); *H04M 1/0237* (2013.01); *H04M 1/0233* (2013.01)

(58) Field of Classification Search
CPC .. G06F 1/1624; H04M 1/0233; H04M 1/0237
USPC ................ 361/679.27, 679.01, 749; 348/836
See application file for complete search history.

(56) References Cited

U.S. PATENT DOCUMENTS

| | | | | |
|---|---|---|---|---|
| 6,028,768 A | * | 2/2000 | Cipolla | 361/679.12 |
| 8,009,424 B2 | * | 8/2011 | Zhu et al. | 361/679.58 |
| 8,780,544 B2 | * | 7/2014 | Liang et al. | 361/679.26 |
| 8,861,199 B2 | * | 10/2014 | Liang et al. | 361/679.58 |
| 2009/0040701 A1 | * | 2/2009 | Lin | 361/681 |
| 2009/0257183 A1 | * | 10/2009 | Yang | 361/679.27 |
| 2010/0210328 A1 | * | 8/2010 | Pirhttilahti et al. | 455/575.4 |

* cited by examiner

*Primary Examiner* — Kristina Fulton
*Assistant Examiner* — Thomas Neubauer
(74) *Attorney, Agent, or Firm* — Winston Hsu; Scott Margo

(57) ABSTRACT

A slide device includes a first body, a second body and a constraint mechanism. The constraint mechanism includes a linkage set disposed on the second body, and a first hook and a second hook respectively disposed on the first body. The linkage set includes a first rod disposed on a first side of the second body, a second rod disposed on a second side of the second body, a first bar disposed between the first rod and the second rod, and a second bar disposed between the first rod and a third side of the second body. The first hook is for hooking a hole on the first rod, and the second hook is for hooking holes on the first rod or the second rod.

19 Claims, 10 Drawing Sheets

SLIDE DEVICE HAVING A MULTI CONSTRAINT FUNCTION

BACKGROUND OF THE INVENTION

1. Field of the Invention

The present invention relates to a slide device, and more particularly, to a slide device utilizing one mechanism to achieve multi constraint function.

2. Description of the Prior Art

A conventional slide tablet computer includes a host module and a panel module. The panel module can slide relative to the host module, so as to stand upon a surface of the host module for providing different operation mode. Further, the panel module can rotate relative to the host module about 90 degrees after standing upon the surface of the host module, so the slide tablet computer can be switched to the different operation modes that respectively correspond to user's demand for preferable view angle. The conventional slide tablet computer further includes a plurality of fixing mechanisms disposed around the casing for preventing the panel module from sliding relative to the host module. The fixing mechanisms are respectively disposed on different sides of the casing, and can be utilized to constrain the movement of the panel module relative to the host module in the different operation modes. The conventional slide tablet computer has drawbacks of complicated structure and huge volume for accommodating the fixing mechanisms having different functions. Therefore, design of a slide tablet computer with simple structure is an important issue in the mechanical industry.

SUMMARY OF THE INVENTION

The present invention provides slide device utilizing one mechanism to achieve multi constraint function for solving above drawbacks.

According to the claimed invention, a slide device includes a first body, a second body slidably and rotatably disposed on the first body, and a constraint mechanism for constraining a movement of the second body relative to the first body. The constraint mechanism includes a linkage set disposed on the second body. The linkage set includes a first rod disposed on a first side of the second body, and a first engaging hole is formed on the first rod. The linkage set further includes a second rod disposed on a second side of the second body, and a second engaging hole is formed on the second rod. The linkage set further includes a first bar and a second bar. Two ends of the first bar respectively pivot to the first rod and the second rod. A first end of the second bar pivots to an end of the first rod different from a pivot point of the first bar, and a second end of the second bar is disposed on a third side of the second body. The first rod is connected to the first bar via the pivot point. The second end of the second bar slides along a first direction. The first rod slides along a second direction different from the first direction, and the second rod slides along a direction opposite to the first direction. The constraint mechanism further includes a first hook disposed on a lateral side of the first body for hooking the first engaging hole on the first rod when the second body is on the first body in a parallel manner, and a second hook disposed on a middle area of the first body for hooking the first engaging hole on the first rod or the second engaging hole on the second rod when the second body is not parallel to the first body.

According to the claimed invention, the first side of the second body intersects the second side and the third side.

According to the claimed invention, the second bar includes a first part and a second part. A first end of the first part is disposed on the third side of the second body. Two ends of the second part respectively pivot to a second end of the first part and the first rod. The linkage set further includes a third bar, and two ends of the third bar respectively pivot to the second body and the second end of the first part.

According to the claimed invention, the linkage set further includes a bridging component disposed on the second body. A slide slot is formed on a surface of the bridging component, and the second end of the first part is slidably disposed inside the slide slot.

According to the claimed invention, the linkage set further includes a resilient component disposed on the second body and connected to the first rod.

According to the claimed invention, the linkage set further includes a push button disposed on the second end of the second bar.

According to the claimed invention, the first rod includes a first magnetic component. The first hook is made of magnetic material, and the first hook is engaged with the first engaging hole by magnetic attraction.

According to the claimed invention, the constraint mechanism further includes an elastic component disposed between the first hook and the first body.

According to the claimed invention, the first rod includes a first magnetic component. The second rod includes a second magnetic component, the second hook is made of magnetic material, and the second hook is engaged with the first engaging hole and the second engaging hole by magnetic attraction.

According to the claimed invention, the first rod includes a first magnetic component, the second rod includes a second magnetic component, and the second hook includes a third magnetic component. The second hook is engaged with the first engaging hole and the second engaging hole by magnetic attraction.

According to the claimed invention, the second hook is separated from the first engaging hole and the second engaging hole by a weight of the third magnetic component when the magnetic attraction is weakened.

According to the claimed invention, the slide device further includes a support mechanism disposed on the first body for standing the second body upon the first body.

The constraint mechanism of the present invention has simple structure, and can be applied to execute lock and unlock function of the slide device in different modes, so as to effectively decrease the manufacturing cost and to enhance the product competition in market.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
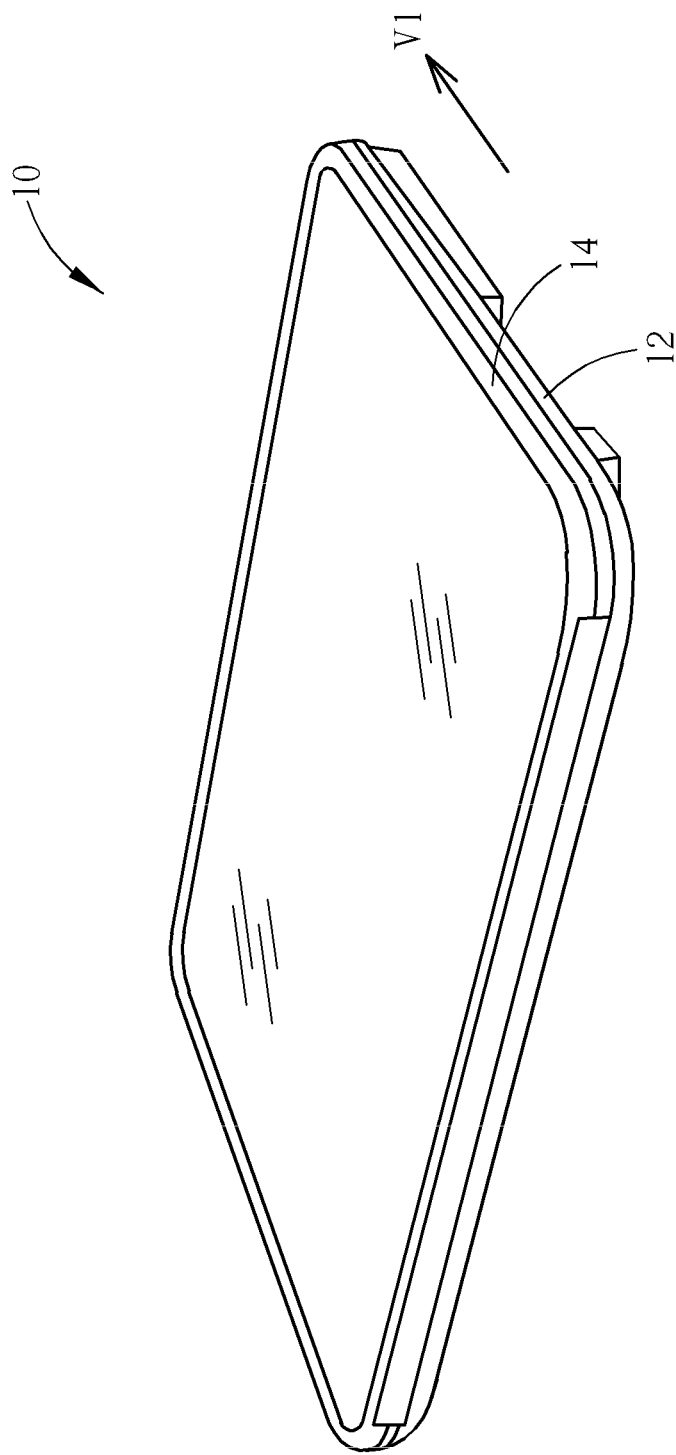
FIG. 1 is a diagram of a slide device in a close mode according to an embodiment of the present invention.
Figure 2:
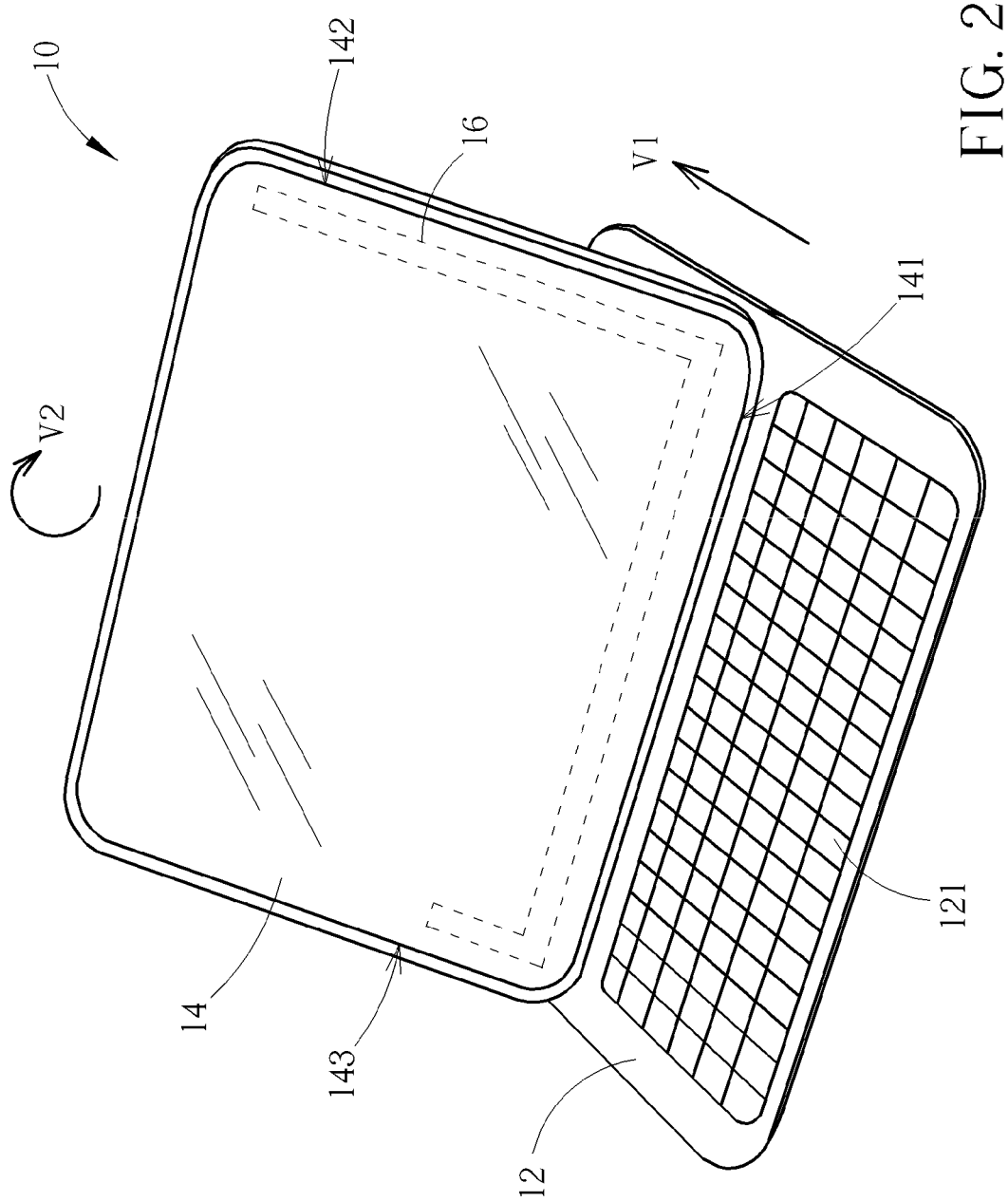
FIG. 2 is a diagram of the slide device in a first open mode according to the embodiment of the present invention.
Figure 3:
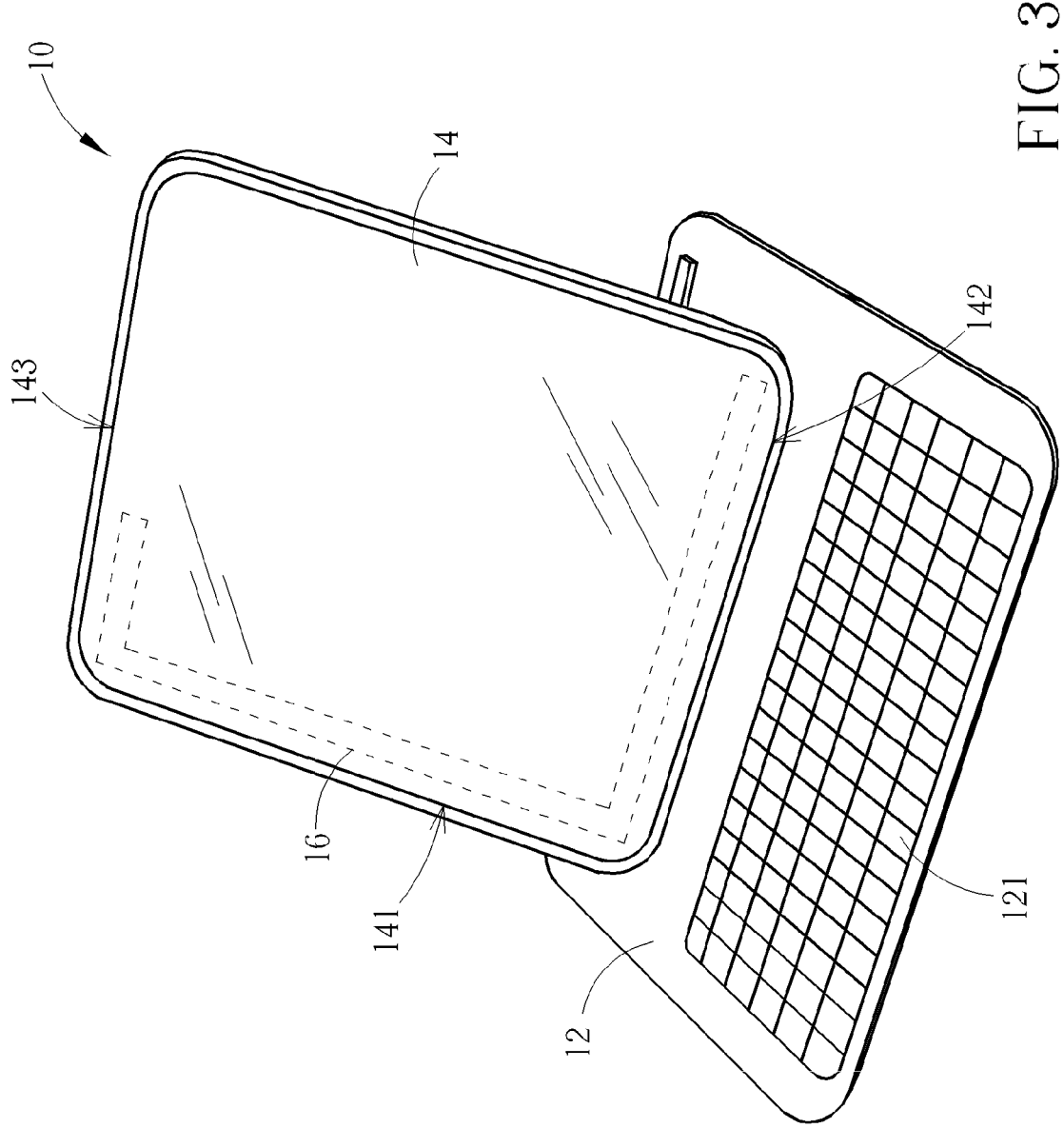
FIG. 3 is a diagram of the slide device in a second open mode according to the embodiment of the present invention.

Please refer to FIG. 1 to FIG. 3. FIG. 1 is a diagram of a slide device 10 in a close mode according to an embodiment of the present invention. FIG. 2 is a diagram of the slide device 10 in a first open mode according to the embodiment of the present invention. FIG. 3 is a diagram of the slide device 10 in a second open mode according to the embodiment of the present invention. The slide device 10 includes a first body 12, a second body 12, a support mechanism 15 and a constraint mechanism 16. The support mechanism 15 (not shown in FIG. 1 to FIG. 3) can be utilized to stand the second body 14 upon the first body 12, so as to expose a keyboard 121 disposed on a surface of the first body 12. The constraint mechanism 16 can constrain a movement of the second body 14 relative to the first body 12, so that the second body 14 can not be parallel to the first body 12 stably when the slide device 10 is in the first open mode and the second open mode. The slide device 10 of the present invention has a multi constraint function to steady the second body 14 in different modes.

Generally, the slide device 10 can be a slide tablet computer. The first body 12 can be a host module with the keyboard, and the second body 14 can be a touch panel module. The slide device 10 can be shut down or in a touch interface mode when the slide device 10 is in the close mode. The slide device 10 can utilize the keyboard of the host module to be an inputting interface when the slide device 10 is in the first open mode and the second open mode.

Figure 4:
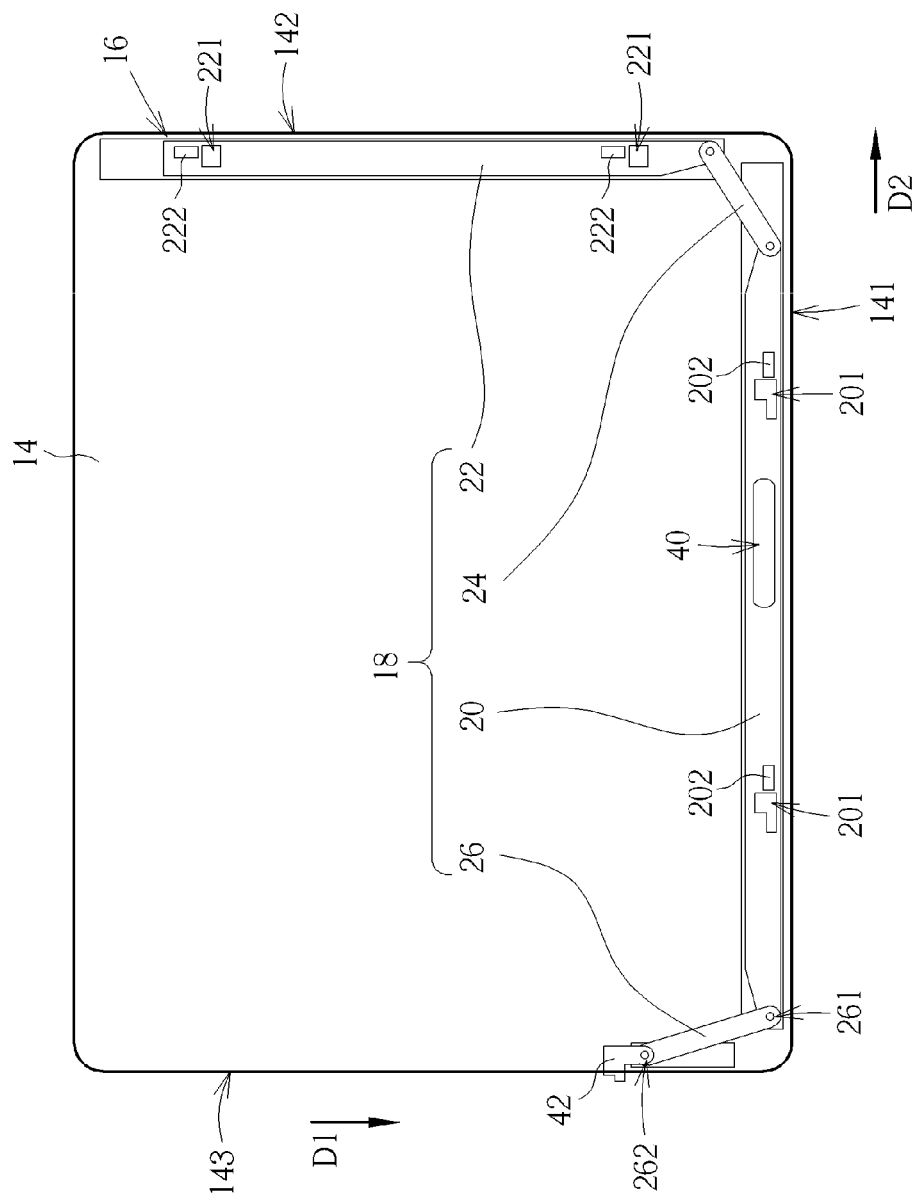
FIG. 4 is a diagram of a constraint mechanism according to the embodiment of the present invention.

Please refer to FIG. 4. FIG. 4 is a diagram of the constraint mechanism 16 according to the embodiment of the present invention. The constraint mechanism 16 includes a linkage set 18 disposed on the second body 14. The linkage set 18 includes a first rod 20 disposed on a first side 141 of the second body 14, and two first engaging holes 201 are formed on the first rod 20. The linkage set 18 further includes a second rod 22 disposed on a second side 142 of the second body 14, and two second engaging holes 221 are formed on the second rod 22. The linkage set 18 further includes a first bar 24, and two ends of the first bar 24 respectively pivot to the first rod 20 and the second rod 22. The linkage set 18 further includes a second bar 26. A first end 261 of the second bar 26 pivots to an end of the first rod 20 different from a pivot point of the first bar 24, and a second end 262 of the second bar 26 is disposed on a third side 143 of the second body 14. The first rod 20 is connected to the first bar 24 via the pivot point.

When the second end 262 of the second bar 26 slides along a first direction D1, the first rod 20 can slide along a second direction D2 different from the first direction D1, and the second rod 22 can slide along a direction opposite to the first direction D1. Thus, the second bar 26 can be driven to simultaneously move the first rod 20 and the second rod 22 relative to the second body 14. The first side 141 of the second body 14 can intersect the second side 142 and the third side 143. As the slide device 10 is in the second open mode shown in FIG. 2, the first side 141 can be an edge of the second body 14 adjacent to the keyboard 121 of the first body 12. The second side 142 can be substantially parallel to the third side 143, and be respectively located on two ends of the first side 141.

Figure 5:
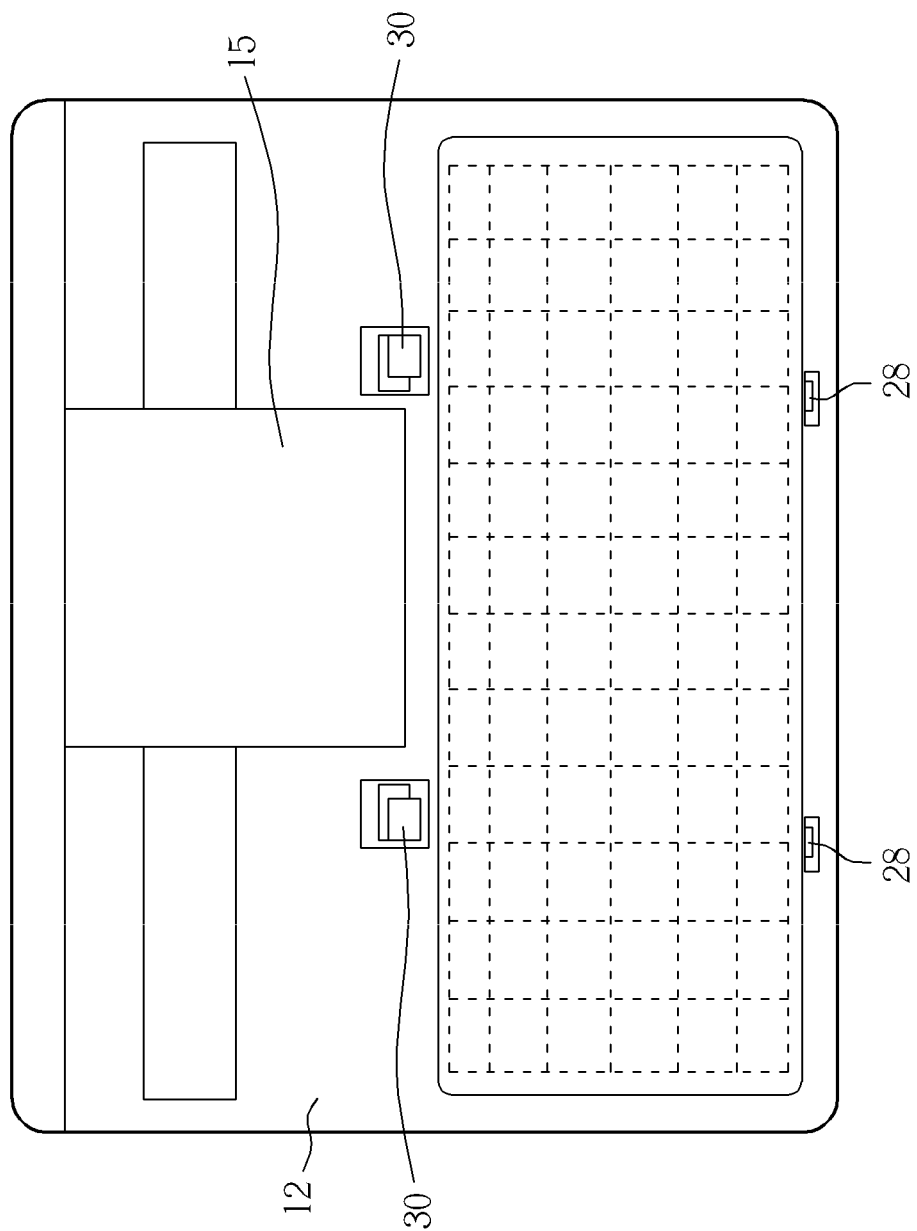
FIG. 5 is a diagram of the support mechanism and the constraint mechanism according to the embodiment of the present invention.

Please refer to FIG. 5. FIG. 5 is a diagram of the support mechanism 15 and the constraint mechanism 16 according to the embodiment of the present invention. An end of the support mechanism 15 can pivot to the first body 12, and the other end of the support mechanism 15 can pivot to the second body 14. The support mechanism 15 can be substantially parallel to the first body 12 and the second body 14, and be hidden between the first body 12 and the second body 14 when the slide device 10 is in the close mode. As the slide device 10 drives to the first open mode or the second open mode, a slide of the second body 14 relative to the first body 12 can rotate the support mechanism 15 from a position lying on the first body 12 to a position standing upon the first body 12, so as to support the second body 14 standing upon the first body 12 stably. Structure and shape of the support mechanism 15 depend on design demand, and detail description is omitted herein for simplicity.

The constraint mechanism 16 further includes two first hooks 28 disposed on a lateral side of the first body 12, and two second hooks 30 disposed on a middle area of the first body 12. The first hook 28 and the second hook 30 can be respectively disposed on two opposite edges of the keyboard 121 of the first body 12. When the slide device 10 is in the close mode shown in FIG. 1, the second body 14 can be on the first body 12 in a parallel manner. Meanwhile, the first hook 28 can hook the corresponding first engaging hole 201 on the first rod 20, so as to constrain the movement of the second body 14 relative to the first body 12. In addition, the second body 14 is not parallel to the first body 12 when the slide device 10 is in the first open mode shown in FIG. 2 (or the second open mode shown in FIG. 3), and the constraint mechanism 16 can utilize the second hook 30 to hook the corresponding first engaging hole 201 on the first rod 20 (or the corresponding second engaging hole 221 on the second rod 22).

Figure 6:
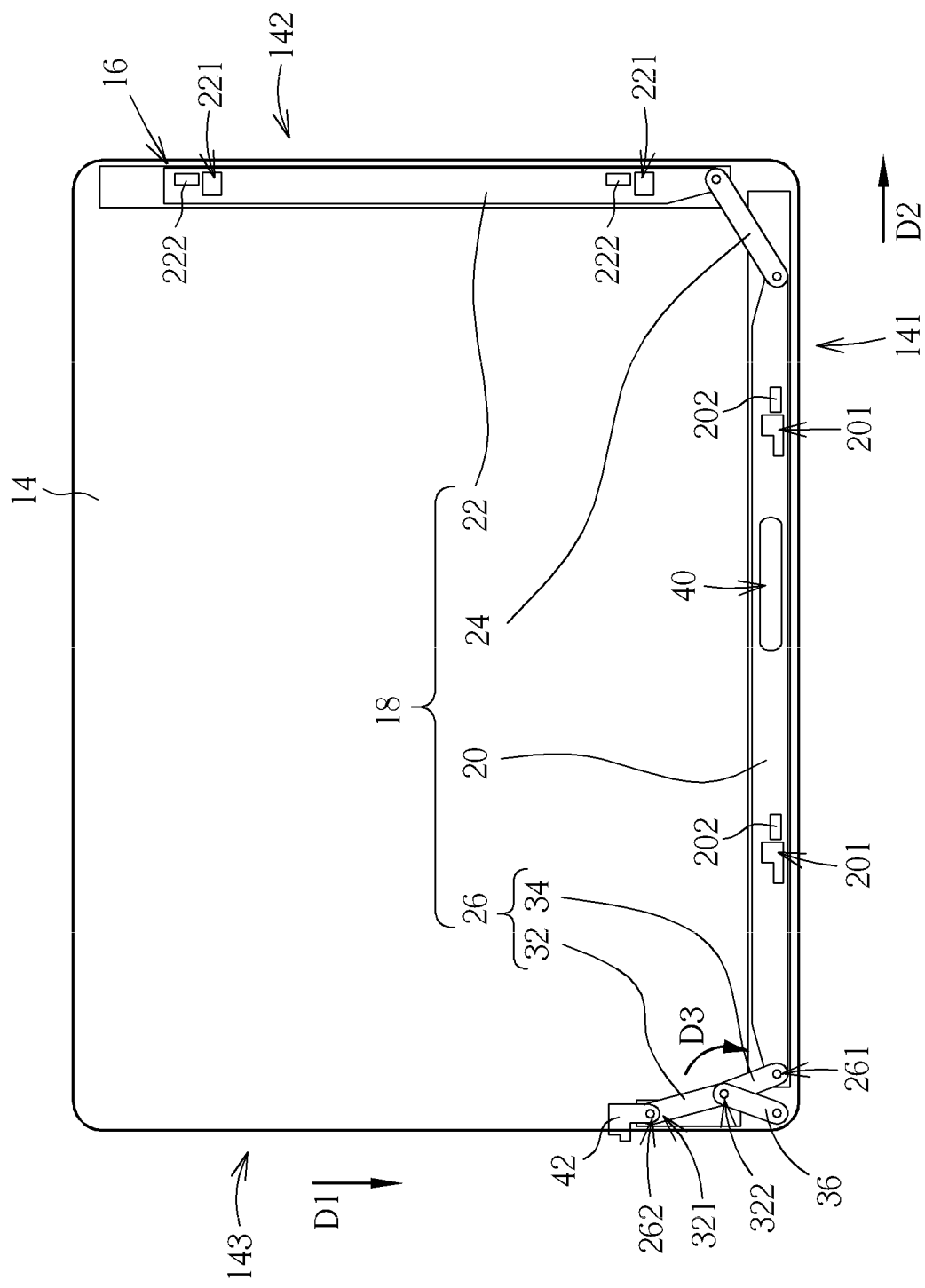
FIG. 6 is a diagram of the constraint mechanism according to the other embodiment of the present invention.

Please refer to FIG. 6. FIG. 6 is a diagram of the constraint mechanism 16 according to the other embodiment of the present invention. In this embodiment, the second bar 26 can be composed of two separate parts. The second bar 26 can include a first part 32 and a second part 34. A first end 321 of the first part 32 can be disposed on the third side 143 of the second body 14. Two ends of the second part 34 can respectively pivot to a second end 322 of the first part 32 and the first rod 20. In addition, the linkage set 18 of this embodiment can further include a third bar 36, and two ends of the third bar 36 can respectively pivot to the second body 14 and the second end 322 of the first part 32. Therefore, the second end 322 can rotate along a third direction D3 different from the first direction D1 and the second direction D2 via a fit of the third bar 36 when the first end 321 of the first part 32 moves along the first direction D1, so that the first rod 20 can be driven to move along the second direction D2, and the second rod 22 can be driven to move along the direction opposite to the first direction D1. In this embodiment, elements having the same numerals as ones of the above-mentioned embodiment have the same structures and functions, and detail description is omitted herein for simplicity.

Figure 7:
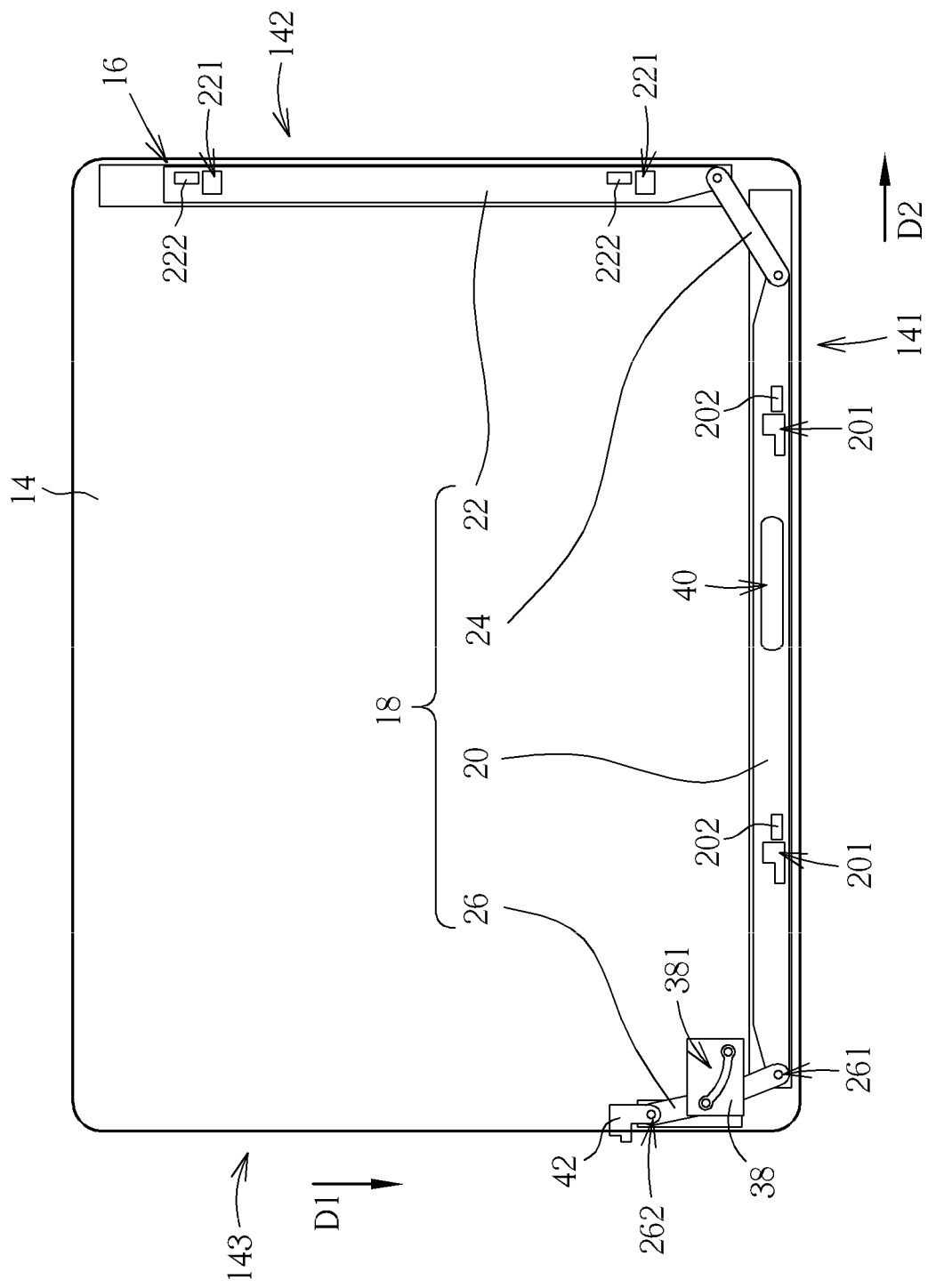
FIG. 7 is a diagram of the constraint mechanism according to the other embodiment of the present invention.

Please refer to FIG. 7. FIG. 7 is a diagram of the constraint mechanism 16 according to the other embodiment of the present invention. In this embodiment, the second bar 26 can be composed of the first part 32 and the second part 34. The linkage set 18 can further include a bridging component 38 disposed on the second body 14. A slide slot 381 can be formed on a surface of the bridging component 38, and the second end 322 of the first part 32 can pivot to an end of the second part 34 and be slidably disposed inside the slide slot 381. The second end 322 can rotate along the third direction D3 via the slide slot 381 on the bridging component 38, so as to simultaneously move the first rod 20 and the second rod 22 relative to the second body 14. In this embodiment, elements having the same numerals as ones of the above-mentioned embodiment have the same structures and functions, and detail description is omitted herein for simplicity.

As shown in FIG. 4, FIG. 6 and FIG. 7, the linkage set 18 can further include a resilient component 40 disposed on the second body 14 and connected to the first rod 20. The resilient component 40 can be a tensional spring. The resilient component 40 can be pulled to store a resilient recovering force when the first rod 20 slides relative to the second body 14 by an external force. The resilient recovering force of the resilient component 40 can drive the first rod 20 back to an initial position when the external force is not applied to the first rod 20. The linkage set 18 can further include a push button 42 disposed on the second end 262 of the second bar 26, which is the same position as the first end 321 of the first part 32. The push button 42 can be a point of application for operating the linkage set 18.

Figure 8:
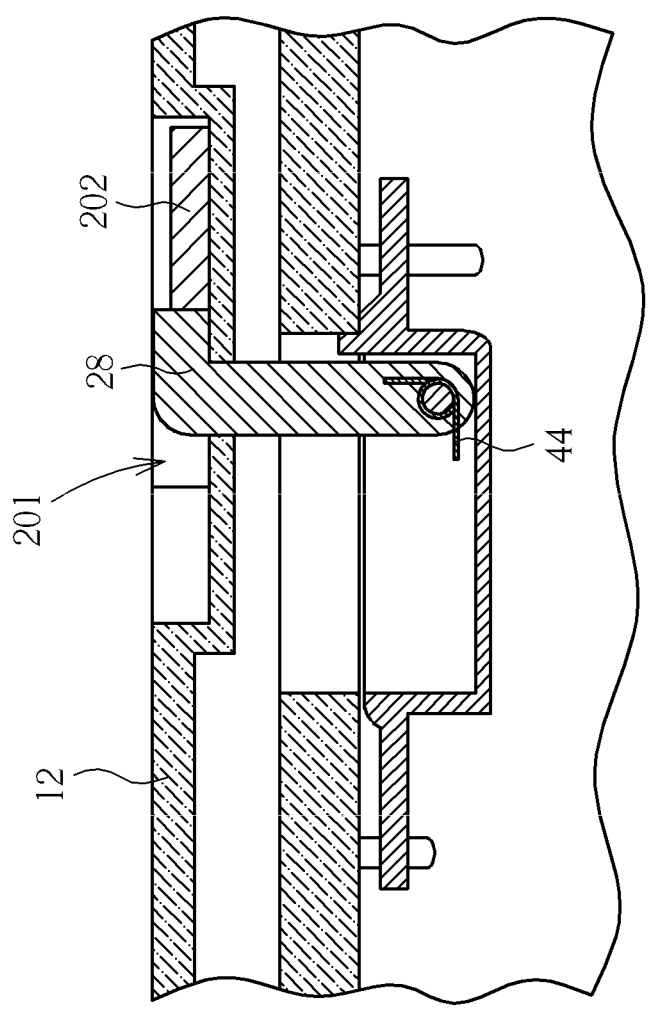
FIG. 8 is a sectional view of the constraint mechanism according to the embodiment of the present invention.

Please refer to FIG. 4 and FIG. 8. FIG. 8 is a sectional view of the constraint mechanism 16 according to the embodiment of the present invention. The constraint mechanism 16 further includes an elastic component 44 disposed between the first book 28 and the first body 12. The elastic component 44 can be a torsional spring. The first rod 20 can include a first magnetic component 202, and the first hook 28 can be made of magnetic material, such as iron material. When the first magnetic component 202 approaches the first hook 28, the first hook 28 can rise up from an inner of the second body 14 by magnetic attraction, so as to engage with the first engaging hole 201. The elastic component 44 can store an elastic recovering force. The magnetic attraction is weakened when the first magnetic component 202 is separated from the first hook 28, and the elastic recovering force of the elastic component 44 can drive the first hook 28 back into the inner of the second body 14.

Figure 9:
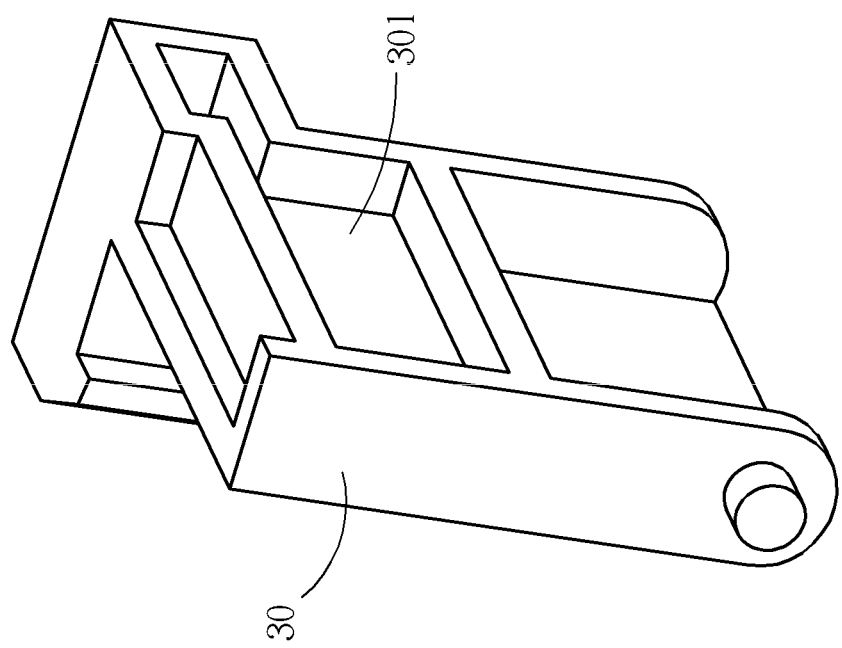
FIG. 9 and FIG. 10 respectively are diagrams of the constraint mechanism in different views according to the embodiment of the present invention.
Figure 10:
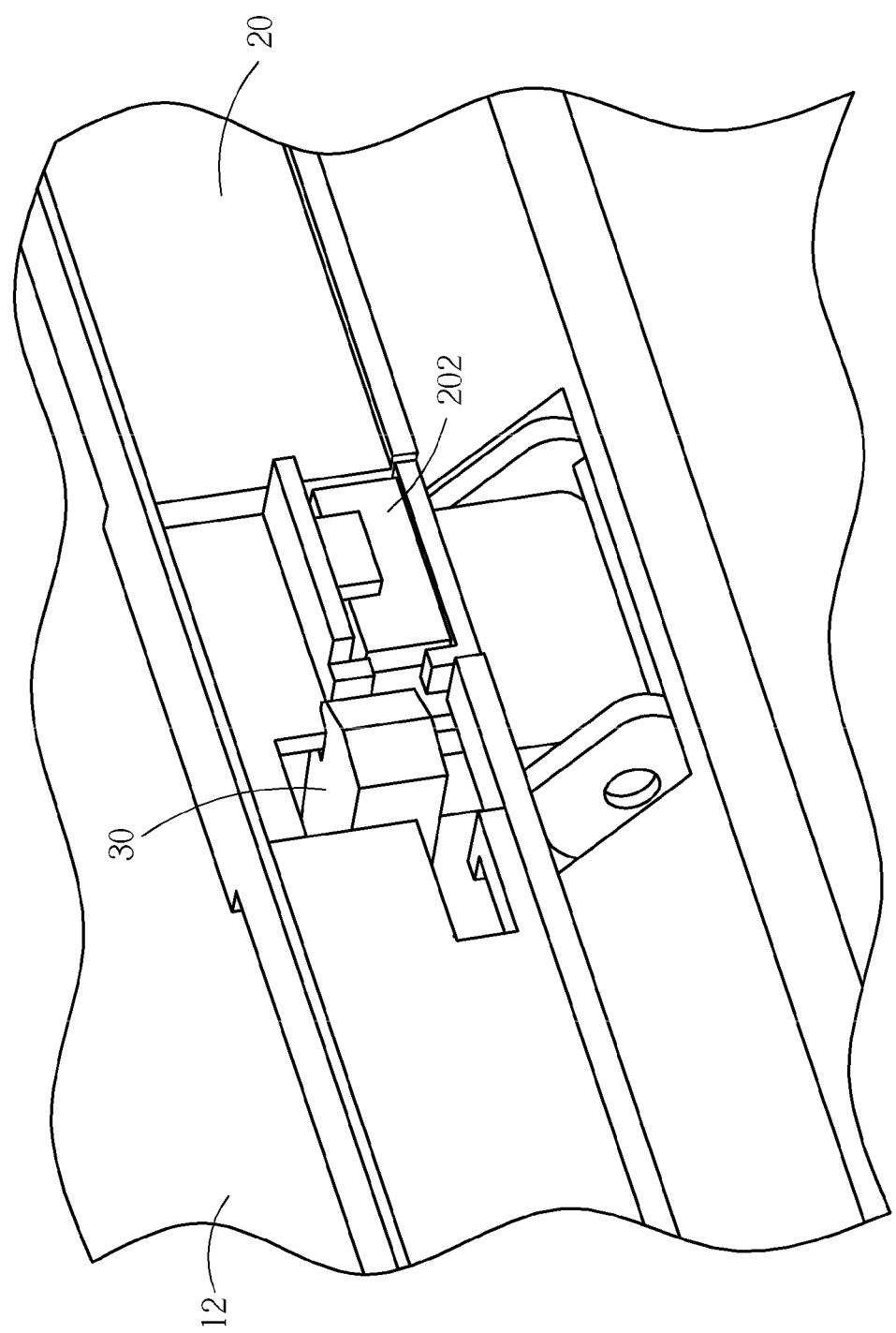

Please refer to FIG. 4, FIG. 9 and FIG. 10. FIG. 9 and FIG. 10 respectively are diagrams of the constraint mechanism 16 in different views according to the embodiment of the present invention. The first rod 20 includes the first magnetic component 202, the second rod 22 can include a second magnetic component 222, and the second hook 30 can include a third magnetic component 301. When the first magnetic component 202 (or the second magnetic component 22) approaches the second hook 30, the second hook 30 can rise up from the inner of the second body 14 by the magnetic attraction, so as to engage with the first engaging hole 201 (or the second engaging hole 221).

When the first magnetic component 202 (or the second magnetic component 222) is separated from the second hook 30, the magnetic attraction is weakened, and the second hook 30 can be separated from the first engaging hole 201 (or the second engaging hole 221) to back into the inner of the second body 14 by its weight and a weight of the third magnetic component 301. It should be mentioned that the second hook 30 can be made of magnetic material, so as to generate the magnetic attraction with the first magnetic component 202 (or the second magnetic component 222) in place of the third magnetic component 301. Design of the magnetic attraction depends on actual demand, and detail description is omitted herein for simplicity.

Operating procedures of the slide device 10 can be introduced as following. As shown in FIG. 1 to FIG. 5, the first hook 28 can be engaged with the first engaging hole 201 by the attraction of the first magnetic component 202 when the slide device 10 is in the close mode shown in FIG. 1, so as to constrain the movement of the second body 14 relative to the first body 12. For switching the slide device 10 from the close mode shown in FIG. 1 to the first open mode shown in FIG. 2, the push button 42 can move along the first direction D1, so the first magnetic component 202 can be separated from the corresponding first hook 28, the first hook 28 loses the magnetic attraction and can be separated from the first engaging hole 201 for releasing the constraint of the constraint mechanism 16.

Meanwhile, the second body 14 can slide relative to the first body 12 along a first actuating direction V1, so that the second body 14 is not parallel to the first body 12 to expose the keyboard 121 by the support mechanism 15, and the first side 141 of the second body 14 can be on the first body 12 and be close to the keyboard 121. In the first open mode, the first rod 20 of the constraint mechanism 16 can move to a position parallel to the second hook 30. The second hook 30 can hook the first engaging hole 201 by the attraction of the first magnetic component 202 and the third magnetic component 301, so as to constrain the movement of the second body 14 relative to the first body 12. Therefore, the slide device 10 can be held in the first open mode by the constraint mechanism 16, a user can watch the second body 14 (the panel module) in the preferable view angle, and input a command by the keyboard 121 selectively.

Furthermore, the push button 42 can move along the first direction D1 for switching the view angle of the second body 14 (the panel module), so that the first magnetic component 202 can be separated from the corresponding third magnetic component 301, and the second hook 30 without the magnetic attraction can be separated from the first engaging hole 201 by its weight, so as to release the constraint of the constraint mechanism 16. At this time, the second body 14 can be reversed relative to the first body 12 along a second actuating direction V2 (a clockwise direction) different from the first actuating direction V1, such as from the first open mode shown in FIG. 2 to the second open mode shown in FIG. 3. In the second open mode, the slide device 10 can still stand the second body 14 upon the first body 12 by the support mechanism 15.

When the slide device 10 is in the second open mode, the second side 142 of the second body 14 can be on the first body 12 and be adjacent to the keyboard 121. The second rod 22 of the constraint mechanism 16 can move to a position parallel to the second hook 30, and the second hook 30 can hook the second engaging hole 221 by the attraction of the second magnetic component 222 and the third magnetic component 301, so as to constrain the movement of the second body 14 relative to the first body 12. Thus, the slide device 10 can be held in the second open mode by the constraint mechanism 16, and the user can watch the second body 14 (the panel module) in the other preferable view angle.

Final, the push button 42 can move along the first direction D1 for switching the slide device 10 from the second open mode to the first open mode or to the close mode, so the second magnetic component 222 is separated from the third magnetic component 301, and the second hook 30 without the magnetic attraction can be separated from the second engaging hole 221 by its weight, so as to release the constraint of the constraint mechanism 16. Then, the second body 14 can rotate or slide relative to the first body 12 according to user's demand for switching the slide device 10 to the close mode or the first open mode.

In conclusion, the slide device of the present invention can dispose the linkage set on third sides of the second body. The push button can be driven to simultaneously move the rods and the bars of the linkage set. The first hook and the second hook of the constraint mechanism can be engaged with the engaging holes by the magnetic attraction. No matter what mode (the close mode, the first open mode and the second open mode) of the slide device is, the push button can be used to unlock the constraint mechanism. In addition, the constraint mechanism can further utilize the resilient recovering force of the resilient component to move the bars and the rods of the constraint mechanism back to the initial positions when the external force is removed, and can further utilize the plurality of magnetic components to drive the first hook and the second hook to engaged with the engaging holes respectively. Therefore, the slide device of the present invention can utilize the constraint mechanism to release the constraint of the second body relative to the first body in different modes.

Comparing to the prior art, the constraint mechanism of the present invention has simple structure, and can be applied to execute lock and unlock function of the slide device in different modes, so as to effectively decrease the manufacturing cost and to enhance the product competition in market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide device comprising:
   a first body;
   a second body disposed on the first body and comprising a first side, a second side and a third side, the first side being connected between the second side and the third side, and the second side being opposite to the third side; and
   a constraint mechanism for constraining a movement of the second body relative to the first body, the constraint mechanism comprising:
      a linkage set disposed on the second body, the linkage set comprising:
         a first rod slidably disposed on the first side of the second body, a first engaging hole being formed on the first rod;
         a second rod slidably located on the second side of the second body, a second engaging hole being formed on the second rod;
         a first bar, two ends of the first bar respectively pivotally connected about the first rod and the second rod; and
         a second bar, a first end of the second bar pivotally connected about an end of the first rod different from a pivot point of the first bar, the first rod being connected to the first bar via the pivot point, and a second end of the second bar being slidably located on the third side of the second body;
         wherein the second end of the second bar slides along a first direction, the first rod slides along a second direction different from the first direction, and the second rod slides along a direction opposite to the first direction;
      a first hook disposed on a lateral side of the first body for hooking the first engaging hole on the first rod when the second body is on the first body in a parallel manner; and
      a second hook disposed on a middle area of the first body for hooking the first engaging hole on the first rod or the second engaging hole on the second rod when the second body is not parallel to the first body.

2. The slide device of claim 1, wherein ends of the first side of the second body respectively pivotally connected about the second side and the third side.

3. The slide device of claim 1, wherein the linkage set further comprises:
   a resilient component disposed on the second body and connected to the first rod.

4. The slide device of claim 1, wherein the linkage set further comprises:
   a push button disposed on the second end of the second bar.

5. The slide device of claim 1, wherein the first rod comprises a first magnetic component, the first hook is made of magnetic material, and the first hook is engaged with the first engaging hole by magnetic attraction.

6. The slide device of claim 1, wherein the constraint mechanism further comprises:
   an elastic component disposed between the first hook and the first body.

7. The slide device of claim 1, wherein the first rod comprises a first magnetic component, the second rod comprises a second magnetic component, the second hook is made of magnetic material, and the second hook is engaged with the first engaging hole and the second engaging hole by magnetic attraction.

8. The slide device of claim 1, wherein the first rod comprises a first magnetic component, the second rod comprises a second magnetic component, the second hook comprises a third magnetic component, and the second hook is engaged with the first engaging hole and the second engaging hole by magnetic attraction.

9. The slide device of claim 1, wherein the second bar comprises a first part and a second part, a first end of the first part is disposed on the third side of the second body, two ends of the second part respectively pivotally connected about a second end of the first part and the first rod, the linkage set further comprises a third bar, and two ends of the third bar respectively pivotally connected about the second body and the second end of the first part.

10. The slide device of claim 9, wherein the constraint mechanism further comprises:
    an elastic component disposed between the first hook and the first body.

11. The slide device of claim 9, wherein the linkage set further comprises a bridging component disposed on the second body, a slide slot is formed on a surface of the bridging component, and the second end of the first part is slidably disposed inside the slide slot.

12. The slide device of claim 9, wherein the linkage set further comprises:
    a resilient component disposed on the second body and connected to the first rod.

13. The slide device of claim 9, wherein the linkage set further comprises:
    a push button disposed on the second end of the second bar.

14. The slide device of claim 9, wherein the first rod comprises a first magnetic component, the first hook is made of magnetic material, and the first hook is engaged with the first engaging hole by magnetic attraction.

15. The slide device of claim 14, wherein the constraint mechanism further comprises:
    an elastic component disposed between the first hook and the first body.

16. The slide device of claim 9, wherein the first rod comprises a first magnetic component, the second rod comprises a second magnetic component, the second hook is made of magnetic material, and the second hook is engaged with the first engaging hole and the second engaging hole by magnetic attraction.

17. The slide device of claim 9, wherein the first rod comprises a first magnetic component, the second rod comprises a second magnetic component, the second hook comprises a third magnetic component, and the second hook is engaged with the first engaging hole and the second engaging hole by magnetic attraction.

18. The slide device of claim 17, wherein the second hook is separated from the first engaging hole and the second engaging hole by a weight of the third magnetic component.

19. The slide device of claim 1, wherein the slide device further comprises a support mechanism disposed on the first body for standing the second body upon the first body.

* * * * *